UNITED STATES PATENT OFFICE.

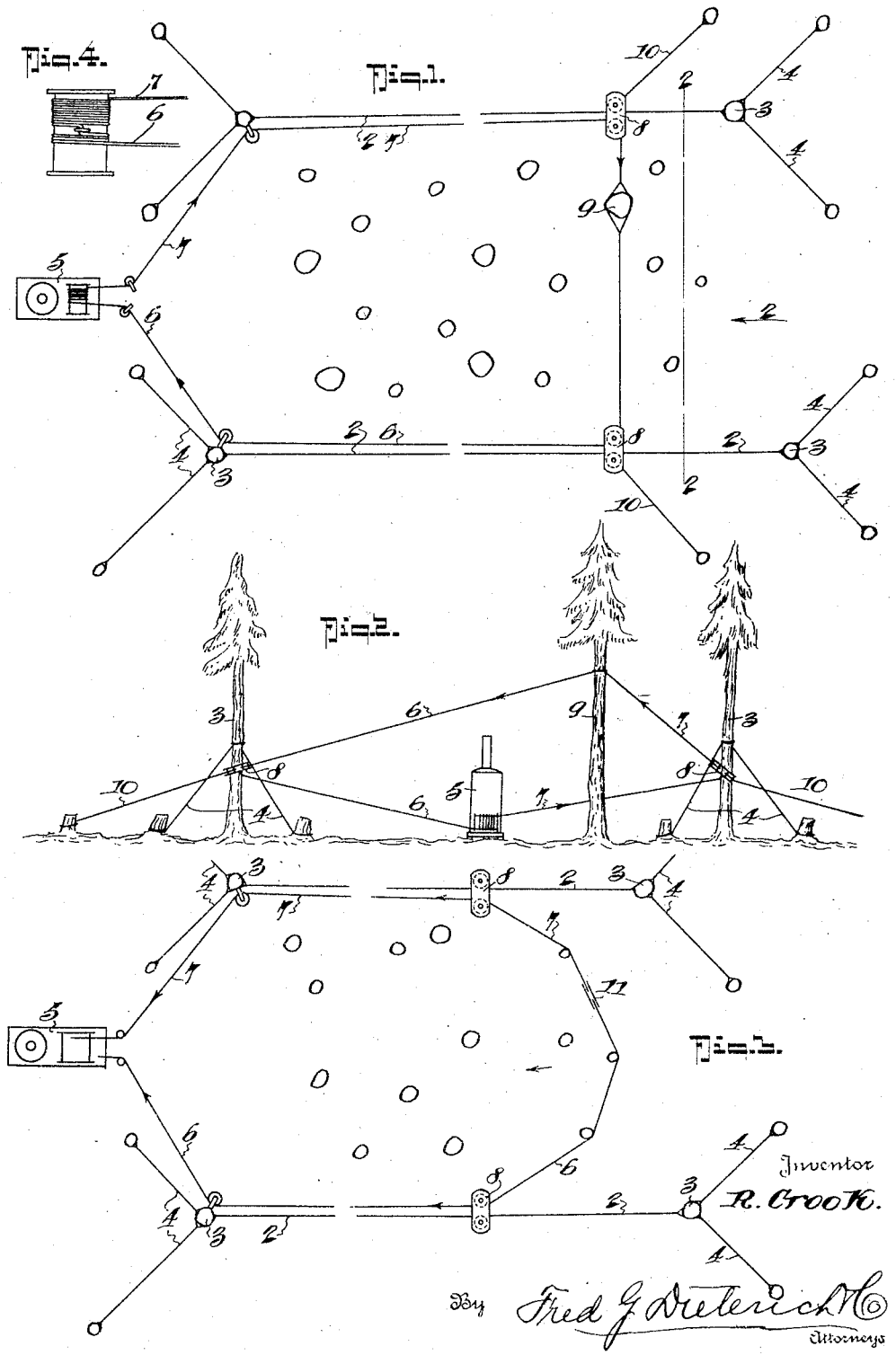

RICHARD CROOK, OF VICTORIA, BRITISH COLUMBIA, CANADA.

LOGGING SYSTEM.

1,365,155. Specification of Letters Patent. Patented Jan. 11, 1921.

Application filed December 3, 1919. Serial No. 342,083.

*To all whom it may concern:*

Be it known that I, RICHARD CROOK, a citizen of the Dominion of Canada, residing at Victoria, in the Province of British Columbia, Canada, have invented certain new and useful Improvements in Logging Systems, of which the following is a specification.

This invention relates to an improved system of logging and for clearing the land of the residue of smaller trees after the usable timber has been logged off.

The device comprises generally two parallel lines of overhead wire rope track, one along each side of the area to be logged, from a powerful donkey engine located at one end of the area included between the parallel rope tracks, hauling lines are taken through guide sheaves along each track, which hauling lines are connected from opposite sides to a tree which it is desired to fall, the connection being made at a sufficient height to afford a powerful leverage sufficient to pull the tree up by the roots.

The system is fully described in the following specification, reference being made to the drawings by which it is accompanied, in which:

Figure 1 is a plan of the area to which the system is applied.

Fig. 2 is a cross section of the area on the line 2—2 in Fig. 1 looking in the direction of the arrow 2, and Fig. 3 is a plan of the supplementary system for clearing the smaller trees off the logged area, and Fig. 4 shows connection of the two hauling ropes to one drum of the donkey engine.

In these drawings 2—2 represents parallel wire rope tracks along each side of the area to be logged. These track ropes or standing lines 2 are made fast to convenient standing trees 3 which should be strongly guyed, as at 4, to sustain the strain of a load on the track ropes.

Intermediate of the end trees 3, between which the track ropes extend, these ropes may be supported from intermediate trees, in any convenient manner that will permit passage of the sheave block or log carriage.

From the drum of a donkey engine 5 hauling lines 6 and 7 of wire rope are taken through suitable guide sheaves along each track rope and through a sheave in a block 8 which is adapted to run on each track rope. The outer ends of these hauling lines 6 and 7 are made fast to a tree 9 to be felled, at a sufficient height up to afford sufficient leverage to pull the tree up by the roots, and to steady its fall.

The ropes 6 and 7 are connected to the middle of the donkey engine drum to coil in opposite directions, as shown in Fig. 4 of the drawing, so that as one rope is drawn in, the other is paid out the same amount, and by this means the tree is pulled up by the roots by the pull of the donkey engine on one rope 6 through the leverage of the height of the connection, while the other rope 7 is paid out and steadies the fall of the tree to the ground.

Provision is made on each block 8 for connection to it of a stout guy rope 10 in approximately the direction of the resultant of the two lines of pull along the track and from the block 8 to the tree 9.

The trees as felled are stripped of their branches and are cross cut into convenient lengths for transportation, for which purpose the same standing lines 2 and hauling lines 6 and 7 are available.

The roots of the trees may also be cut up for ships, knees or the like.

Obviously, when the area included between the standing lines 2 is on a suitable incline toward the place of delivery, the lines 6 and 7 may be connected together and the logs will be carried by gravity along each track rope alternately and the donkey engine will not be required.

After all timber has been felled in this manner, which are available either for lumbering or otherwise, the residue of small timber within the logged area may, as shown in Fig. 3, be pulled down by connecting together the ends of the two hauling ropes 6 and 7 in any suitable way, as at 11, (see Fig. 3) across between the standing lines 2 and both ropes may be drawn in by the donkey to pull down all trees between the standing lines and toward the donkey engine. If any particular tree offers unexpected resistance either of the ropes 6 or 7 can be individually applied to it.

Having now particularly described my invention, I hereby declare that what I claim as new and desire to be protected in by Letters Patent, is:

1. A logging system, comprising a wire rope track line along each side of the area to be logged, sheave blocks mounted on the track lines, and means operative around these sheave blocks for pulling the trees between the track lines up by the roots and for steadying their fall.

2. A logging system, comprising a wire rope track line along each side of the area to be logged, sheave blocks mounted on the track lines, and means operative around the sheave blocks for pulling the trees between the track lines up by the roots and for steadying their fall, and including means for drawing the logs cut from these trees to the standing track lines and for conducting them along the same to the place of delivery.

3. A logging system, comprising a wire rope track supported along each side of the area to be logged, a sheave block carriage endwise movable along each standing line, a hauling line conducted along each standing line and around the sheave block on the same, the end of each hauling line being connected from opposite sides to a tree to be felled in the area between the standing lines, and means for simultaneously hauling in one line and paying out the other whereby the tree may be pulled up by its roots and steadied in its fall.

4. A logging system, comprising a wire rope track line along each side of the area to be logged, sheave blocks mounted on the track line, means operative around these sheave blocks for pulling the trees between the track lines up by the roots and for steadying their fall, including means for drawing the logs cut from these trees to the standing track lines and for conducting them along the same to the place of delivery, and means for connecting the ends of the tree felling lines together to enable them and their sheave blocks to be drawn along the track lines toward one end whereby the smaller trees within the logging area are uprooted.

5. A logging system, comprising a donkey engine having a drum, wire rope, track lines suitably supported along each side of the area to be logged, a sheave block endwise movable along each track line, hauling lines connected to a tree to be felled which lines pass severally through the sheave blocks on the track lines and along the lines for connection over diametrically opposite sides to the drum of the donkey engine, one line being wound on the drum while the other is unwound therefrom.

In testimony whereof I affix my signature.

RICHARD CROOK.